United States Patent Office 2,843,608
Patented July 15, 1958

2,843,608

4-ESTRENE-3,17-DIOL, ESTERS AND 17-ALKYL DERIVATIVES

Frank B. Colton, Chicago, Ill., assignor to G. D. Searle & Co., Chicago, Ill., a corporation of Delaware No Drawing. Application March 16, 1956
Serial No. 571,872

Claims priority, application Canada October 11, 1955

9 Claims. (Cl. 260—397.5)

The present invention relates to certain highly active synthetic anabolic agents and, more particularly, to 4-estrene-3,17-diol, its 17-alkyl derivatives and esters thereof. The compounds which constitute this invention can be represented by the general structural formula

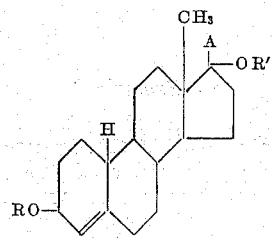

wherein R and R' are members of the class consisting of hydrogen, benzoyl, and acyl radicals derived from aliphatic hydrocarbon carboxylic acids containing one to eight carbon atoms. The radical A can represent either a hydrogen atom or a lower alkyl radical.

In the foregoing structural formula R and R' can represent hydrogen, benzoyl radicals and acyl radicals, derived from aliphatic carboxylic acids, such as formyl, acetyl, propionyl, butyryl, pentanoyl, hexanoyl, cyclopentaneacetyl, cyclopentanepropionyl, cyclohexaneacetyl, and the like. The radical A can represent hydrogen or lower alkyl radicals such as methyl, ethyl, straight-chained or branched propyl and butyl.

The compounds of this invention are relatively weak androgenic agents. They are of special value in human and in veterinary therapy because of their very high degree of activity in promoting nitrogen anabolism. These compounds also have anti-estrogenic properties.

The compounds of the foregoing structural formula can be conveniently prepared by reduction of the corresponding 3-oxo compounds. The reduction can be carried out with reagents which selectively reduce an oxo group without reducing the unsaturated linkage between the carbon atoms in positions 4 and 5. Typically, the Meerwein-Ponndorf-Verley reaction can be used. Especially useful are alkali metal aluminum hydrides and borohydrides such as lithium aluminum hydride and sodium borohydride.

The 4-estrene-3,17-diols substituted in the 17-position by an alkyl group can be conveniently prepared by the hydrogenation of 17α-substitution products of 4-estrene-3,17-diol in which the α-substituent is an unsaturated aliphatic hydrocarbon radical. Such radicals can incorporate unsaturated linkages of either the ethylene or acetylene type and include, illustratively, ethynyl, propynyl, and butynyl, as well as vinyl, propenyl, allyl, and higher homologs thereof.

As an example of a method for carrying out such a hydrogenation, 17α-ethynyl-4-estrene-3,17-diol, in a solution or suspension, is shaken in a hydrogen atmosphere in the presence of a suitable catalyst, for example a noble metal catalyst such as palladium on charcoal. This compound is reduced in stages to 17α-vinyl-4-estrene-3,17-diol and then to 17-ethyl-4-estrene-3,17-diol. Under the reaction conditions described herein, hydrogenation of the nuclear double bond is a relatively minor side reaction. A useful, and obviously equivalent modification of this procedure for the manufacture of 17-ethyl-4-estrene-3,17-diol is the catalytic reduction of 17α-vinyl-4-estrene-3,17-diol.

Useful starting materials for the preparation of 17α-alkenyl and alkynyl derivatives of 4-estrene-3,17-diol are the 17α-substitution products of 19-nortestosterone in which the 17α-substituent is an unsaturated aliphatic hydrocarbon radical. These are conveniently prepared by a variety of procedures which involve the addition of acetylene, a homolog of acetylene, or an organo-metallic compound to a steroidal 17-ketone. For example, 17α-ethynyl-19-nortestosterone can be prepared by the addition of acetylene to 3-methoxy-2,5(10)-estradien-17-one, followed by acid-catalyzed hydrolysis and isomerization of the resulting product. The addition of allylmagnesium bromide to 3-methoxy-2,5(10)-estradien-17-one followed by acidic hydrolysis and isomerization affords 17-allyl-19-nortestosterone. These 19-nortestosterone derivatives can then be selectively reduced in the 3-position, e. g. with alkali metal aluminum hydride or borohydride or by the Meerwein-Ponndorf-Verley reaction to yield the 17α-substitution products of 4-estrene-3,17-diol.

The 3,17-diesters of this invention are obtained from the 3,17-diols by conventional procedures. The 3-hydroxy group can be selectively esterified by using one molecular equivalent of acyl halide or anhydride; this method is particularly applicable to the 17-substituted derivatives. 17-monoesters are obtained by the reduction with sodium borohydride or an equivalent reagent of the corresponding esters of 19-nortestosterone or its 17α-substituted derivatives; esterification of the 3-hydroxy group of the resulting monoesters makes available diesters substituted by two different acyl groups.

The compounds and methods of manufacture which constitute this invention will appear more fully from the following examples. In these examples quantities are given in parts by weight and temperatures are given uncorrected in degrees centigrade (° C.).

This application is a continuation-in-part of my copending application Serial No. 464,652, filed on October 25, 1954, now abandoned.

*Example 1*

A solution of 7.2 parts of 19-nortestosterone in 700 parts of ether is added, with stirring, to a suspension of 6 parts of lithium aluminum hydride in 210 parts of ether. The mixture is stirred and heated at 35° C. for 45 minutes after which a sufficient amount of acetone is added to decompose the excess of the lithium aluminum hydride. Water is added and the organic layer is separated, washed with water, and then with saturated sodium chloride solution. After drying over anhydrous sodium sulfate and filtration, the solvent is removed under vacuum. The residue is applied in a 10% solution of ethyl acetate in benzene to a chromatography column containing 760 parts of silica gel. The column is washed with benzene and 5, 10, and 15% solutions of ethyl acetate in benzene. Elution with a 20% solution of ethyl acetate in benzene and repeated recrystallization of the residue from a mixture of ethyl acetate and cyclohexane yields a 4-estrene-3,17-diol which melts at about 202–204° C. The infrared absorption spectrum shows bands at 3.00, 6.05, 6.85, 7.01, 7.25, 7.43, 7.60, 7.85, 8.80, 9.19, 9.46, 9.70, 10.06, and 10.22 microns. This compound is apparently the 4-estrene-3α,17β-diol.

*Example 2*

To a solution of 14.4 parts of 19-nortestosterone in 400 parts of methanol and 50 parts of ethyl acetate is added a solution of 10 parts of sodium borohydride in 200 parts of methanol. The mixture is maintained at room temperature for an hour and treated first with 30 parts of water and then a sufficient amount of acetic acid to lower the pH to 6.0. The reaction mixture is concentrated on a steam bath with a current of nitrogen to about 50 parts. After dilution with 600 parts of water the precipitate is collected on a filter and washed with water. Chromatography on silica gel by the method of the preceding example yields a 4-estrene-3,17-diol of the same physical properties as that obtained in the preceding example.

Example 3

To a suspension of 6 parts of lithium aluminum hydride in 2100 parts of ether there are added, with stirring, 7.2 parts of 19-nortestosterone in 700 parts of ether. The mixture is stirred with heating on the steam bath for 45 minutes, after which the unreacted lithium aluminum hydride is decomposed by addition of acetone. The mixture is diluted with water and the organic layer is separated and washed successively with water and saturated aqueous sodium chloride solution. After drying over anhydrous sodium sulfate, the ether solution is evaporated under vacuum and the residue is dissolved in benzene and thus applied to a chromatography column containing 760 parts of silica gel. The column is developed with benzene and then successively with 5 and 10% solutions of ethyl acetate in benzene. Further elution with a 15% solution of ethyl acetate in benzene and concentration of the eluate yields a residue which is recrystallized from acetone and water, ethyl acetate and petroleum ether, and again from acetone and water to yield a 4-estrene-3,17-diol melting at about 169–172° C. This compound is apparently the 4-estrene-3β,17β-diol. This compound shows infrared maxima at 2.91, 6.0, 6.90, 8.26, 8.78, 9.38, 9.61, 11.21, 11.43, and 11.62 microns. It shows no ultraviolet absorption between 220 and 360 millimicrons.

Further development of the column with a 20% solution of ethyl acetate in benzene and concentration of the eluate gives a relatively smaller amount of what is presumably the 3α-epimer of the above 4-estrene-3,17-diol. Successive crystallizations from aqueous methanol and then from ethyl acetate and cyclohexane yields a product melting at about 202–204° C. The infrared absorption spectrum shows maxima at 3.0, 6.05, 7.01, 7.23, 7.42, 7.84, 8.80, 9.19, 9.46, 10.05, 11.06, and 11.64 microns.

Example 4

To a mixture of 35 parts of 19-nortestosterone propionate, 100 parts of methanol and 10 parts of ethyl acetate are added 20 parts of sodium borohydride in 50 parts of methanol. After stirring at room temperature for 1 hour, 6 parts of water are added and the pH is lowered to 6 by addition of acetic acid. The mixture is reduced to about one-third of its original volume by concentration on the steam bath under nitrogen and then the residue is diluted with twice its volume of water. The precipitate is collected on a filter, washed with water, and submitted to chromatography over a silica gel column by the method of Example 1. Elution with a 10% solution of ethyl acetate in benzene yields the 17-propionoxy-4-estren-3-ol. The infrared absorption shows maxima at 2.9 and 5.8 microns.

Example 5

A mixture of 1 part of 4-estrene-3β,17β-diol, 10 parts of benzoic anhydride and 1 part of finely powdered potassium benzoate is stirred for 24 hours at 50° C. and then treated with ice and permitted to stand at room temperature for an additional 3 hours. The resulting precipitate is collected on a filter, washed with water and crystallized successively from aqueous ethanol and cyclohexane. The resulting 3β,17β-dibenzoyloxy-4-estrene shows infrared maxima at 5.8 and 6.1 microns.

Example 6

To a mixture of 22 parts of 19-nortestosterone β-cyclopentanepropionate in 1000 parts of methanol are added 50 parts of ethyl acetate and 10 parts of sodium borohydride in 200 parts of methanol. The mixture is stirred at 20° C. for 10 minutes, and then treated with 30 parts of water and a sufficient amount of glacial acetic acid to lower the pH to about 6.0. The mixture is diluted with four times its volume of water. A precipitate forms which is collected on a filter asd washed with water. On crystallization from ethyl acetate and cyclohexanone there is obtained 17-(β-cyclopentanepropionoxy)4-estren-3-ol which can be further purified by silica gel chromatography. The product shows infrared maxima at 3.0, 5.8, and 6.05 microns. It has the structural formula

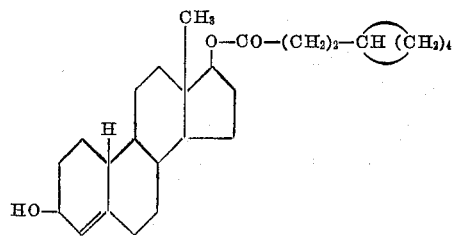

Example 7

A mixture of 10 parts of 4-estrene-3,17-diol (melting at approximately 169–172° C.), 50 parts of acetic anhydride, 100 parts of glacial acetic acid and 2 parts of sodium acetate is maintained at room temperature for 2 hours and then treated with ice and permitted to stand for an additional 2-hour period. The precipitate is collected on a filter and washed with water. On successive recrystallizations from aqueous methanol and from cyclohexane there is obtained 3,17-diacetoxy-4-estrene which melts at about 135–137.5° C.

Example 8

A solution of 28 parts of 4-estrene-3,17-diol (melting at 169–172° C.) in 200 parts of pyridine and 70 parts of propionic anhydride is maintained at 55° C. for 90 minutes. Then ice is added and after 30 minutes the precipitate is collected on a filter, washed with water and crystallized from aqueous methanol. The 3,17-dipropionoxy-4-estrene thus obtained melts at about 98–100° C. Infrared maxima are observed at 5.77, 6.83, 7.23, 7.43, 7.83, 8.33, 9.19, 9.33, and 9.89 microns.

Use of β-cyclopentylpropionic anhydride in equivalent amount in lieu of the propionic anhydride and heating for 6 hours instead of 90 minutes yields the 3,17-bis(β-cyclopentylpropionoxy)-4-estrene.

Example 9

A mixture of 10 parts of 17α-ethynyl-3-methoxy-1,3,5-(10)-estratrien-17-ol, 2.5 parts of 5% palladium on charcoal catalyst and 50 parts of dioxane is shaken in contact with a hydrogen atmosphere until 2 molecular equivalents of hydrogen have been consumed. The catalyst is removed by filtration, and the residue remaining after concentration of the filtrate is purified by recrystallization from a mixture of ether and petroleum ether. In this manner there is obtained 17α-ethyl-3-methoxy-1,3,5(10)-estratrien-17-ol melting at about 88–89° C.

A solution of 50 parts of 17α-ethyl-3-methoxy-1,3,5-(10)-estratrien-17-ol in 710 parts of ether is diluted with 2500 parts of liquid ammonia. Throughout the following operations, until the reaction mixture is diluted with water, it is constantly stirred and is maintained at an approximately constant volume by the addition of a total of 2100 parts of ether in portions, to replace the ammonia which is continuously lost by vaporization. The solution of 17α-ethyl-3-methoxy-1,3,5(10)-estratrien-17-ol in ether and liquid ammonia is treated over a period of 35 minutes by the addition of a total of 35 parts of lithium in small portions. After an additional hour, 240 parts of ethanol is added in small portions over a period of 3 hours, and stirring is continued for several hours more. Water (1000 parts) is added, and the ethereal phase is washed with several portions of water, dried and concentrated. The residue obtained by evaporation of the ethereal solution is stirred with a mixture of 200 parts of methanol and 1 part of pyridine, and the resulting suspension is refrigerated for several hours. The crystalline product is collected on a filter and washed with 120 parts of cold methanol. This compound is 17α-ethyl-3-methoxy-2,5(10)-estradien-17-ol melting at about 127–128° C.

A mixture of 1.25 parts of 17α-ethyl-3-methoxy-2,5-(10)-estradien-17-ol, 24 parts of methanol and 4 parts of acetic acid is heated under reflux for 5 minutes. Water (150 parts) is added and the mixture is refrigerated for several hours. The precipitated product is collected on a filter and dried. Recrystallization from a mixture of acetone and petroleum ether affords 17a-ethyl-3-oxo-5(10)-estren-17-ol melting at about 134–136° C.

A mixture of 10 parts of 17α-ethyl-3-oxo-5(10)-estren-17-ol, 160 parts of methanol, 20 parts of water and 7 parts of concentrated hydrochloric acid is stirred for 2 hours at room temperature and is then chilled and allowed to stand at 0° C. for 2 hours. The mixture is filtered from a small amount of insoluble material, and the filtrate is diluted, with constant stirring, with 500 parts of water. The mixture is then cooled to about 0–5° C. and filtered. The crystalline product can be purified by recrystallization from aqueous methanol, or from a mixture of acetone and petroleum ether. In this manner there is obtained 17-ethyl-19-nortestosterone melting at about 140–141° C.

To a solution of 2 parts of 17α-ethyl-19-nortestosterone in 25 parts of methanol are added 2 parts of sodium borohydride in 12 parts of methanol. The mixture is maintained at room temperature for 60 minutes and then treated by slow acidification with acetic acid. The mixture is diluted with 150 parts of water and cooled to 0° C. The resulting precipitate is collected on a filter, washed with water and recrystallized from aqueous methanol using charcoal decolorization. There is thus obtained 17α-ethyl-4-estrene-3,17-diol. It appears that this product contains predominantly the 3β,17β-isomer and that there is a minor admixture of the 3α-epimer. When placed on a melting point block the product melts at about 80° C., partially resolidifies and melts again at about 125° C. The above material displays no specific absorption in the ultraviolet region between 220 and 360 millimicrons.

*Example 10*

A mixture of 3 parts of 17α-ethynyl-19-nortestosterone, 3 parts of sodium borohydride and 160 parts of methanol is maintained at room temperature for 20 minutes, after which 10 parts of water are added. The mixture is then acidified with acetic acid and slowly diluted with water. Upon chilling a precipitate forms which is recrystallized successively from aqueous methanol and then from a mixture of ethyl acetate and petroleum ether to yield 17α-ethynyl-4-estrene-3,17-diol melting at about 149–152° C. The infrared absorption spectrum of this compound shows maxima at 2.89, 3.08, 6.03, 6.92, 7.12, 7.23, 7.71, 8.29, 8.52, 8.72, 8.82 and 9.08 microns.

Through a mixture of 11 parts of charcoal containing 5% palladium in 2000 parts of dioxane a stream of hydrogen is passed for an hour. Then 87 parts of 17α-ethynyl-4-estrene-3,17-diol in 1500 parts of dioxane are added and the mixture is hydrogenated until 2 molecular equivalents of hydrogen are absorbed. The catalyst is then removed by filtration and the solvent is evaporated under vacuum. The crystalline residue is dissolved in 2700 parts of benzene and thus applied to a chromatography column containing 5000 parts of silica gel. The column is developed with benzene and then with 5 and 10% solutions of ethyl acetate in benzene. Elution with a 15% solution yields the 17α-ethyl-4-estrene-3,17-diol which has the same physical properties as the product of the preceding example.

*Example 11*

A mixture of 10.8 parts of 17α-ethynyl-4-estrene-3,17-diol, 300 parts of dioxane, 1000 parts of pyridine and 6 parts of a 5% palladium on calcium carbonate catalyst is shaken in contact with a hydrogen atmosphere until approximately 1 molecular equivalent of hydrogen has been consumed. At this point the hydrogenation is stopped and the catalyst is removed by filtration. The filtrate is concentrated under vacuum to about 100 parts, diluted with 600 parts of ether and washed with normal hydrochloric acid until a Congo Red test shows an acidic reaction. The solution is washed successively with water, with 5% sodium bicarbonate solution, again with water and with saturated sodium chloride solution. The ethereal phase is dried over sodium sulfate, concentrated on a steam bath to about 100 parts and diluted with 150 parts of petroleum ether. After storage at 0° C. for 12 hours, the 17-vinyl-4-estrene-3,17-diol thus obtained is collected on a filter, dried and crystallized from a mixture of ethyl acetate and petroleum ether. The infrared absorption spectrum shows maxima at 2.9 and 6.0 microns.

A mixture of 5 parts of 17α-vinyl-4-estrene-3,17-diol thus obtained, 40 parts of dioxane and 1.5 parts of a 5% palladium on charcoal catalyst is shaken in contact with a hydrogen atmosphere until approximately 1 molecular equivalent of hydrogen has been consumed. The catalyst is removed by filtration, and the filtrate is concentrated to dryness under reduced pressure. Repeated crystallization of the residue from methanol affords 17α-ethyl-4-estrene-3,17-diol showing a double melting point at about 80 and 130° C.

*Example 12*

A solution of 1 part of 17α-ethyl-19-nortestosterone in 120 parts of absolute 2-propanol is treated with 11 parts of freshly distilled aluminum isopropylate and then slowly distilled until the distillate no longer contains acetone. The remaining 2-propanol is distilled off and the residue poured into 200 parts of stirred cold water. The mixture is extracted with ether. This extract is washed with water, dried over anhydrous sodium sulfate, filtered and evaporated. The residue is recrystallized as in Example 9 to yield 17-ethyl-4-estrene-3,17-diol which has the same properties as the product of that example.

Substitution of 17α-methyl-19-nortestosterone in lieu of the 17α-ethyl compound used hereinabove yields 17-methyl-4-estrene-3,17-diol. The infrared absorption spectrum of this compound shows maxima at 2.92, 6.03, 6.9, 7.3, and 8.7 microns.

*Example 13*

A solution of 1 part of 17α-ethyl-4-estrene-3,17-diol in 4 parts of propionic anhydride and 4 parts of pyridine is heated on a steam bath in a nitrogen atmosphere for an hour and then treated with ice. The solid precipitate is collected on a filter and recrystallized successively from aqueous methanol and petroleum ether. The 17α-ethyl-3-propionoxy-4-estren-17-ol thus obtained melts at about 87–88.5° C. A chloroform solution of this compound shows infrared maxima at 2.79, 5.82, 6.87, 8.40, 9.25, and 9.92 microns.

*Example 14*

A solution of 10 parts of 17α-ethyl-4-estrene-3,17-diol, 20 parts of pyridine and 20 parts of β-cyclopentylpropionic anhydride is maintained at 70° C. for 150 minutes. Then ice is added and, after 3 hours standing, the mixture is extracted with ether. The ether extract is washed successively with dilute sodium carbonate solution, water, dilute sulfuric acid, water and a saturated solution of sodium chloride. The solvent is removed by heating on a steam bath in a current of nitrogen. The oily residue is applied to a silica gel chromotography column in benzene solution. The column is washed with benzene. Elution with a 2% solution of ethyl acetate in benzene and evaporation of the eluate yields an oil. The infrared absorption spectrum of the 3 - (β-cyclopentylpropionoxy) - 17α - ethyl - 4 - estren-17-ol thus obtained shows bands at 2.73, 5.80, 6.87, 7.22, 7.38, 7.52, 7.92, and 8.42 microns in chloroform solution.

*Example 15*

A mixture of 253 parts of 17α-ethyl-4-estrene-3,17-diol, 852 parts of succinc anhydride and 2000 parts of pyridine is heated on a steam bath for 90 minutes and then treated with ice. After 30 minutes the precipitate is collected on a filter, washed with water and recrystallized first from aqueous methanol and then from a mixture of ethyl acetate, cyclohexane, and petroleum ether. The 3-hemisuccinate of 17α-ethyl-4-estrene-3,17-diol thus obtained melts at about 168–170° C.

To a solution of 8.8 parts of this hemisuccinate in 900 parts of acetone are added 150 parts of 2-amino-2-methyl-1-propanol. A precipitate forms immediately which is collected on a filter and washed with acetone. The salt so formed melts at about 175–180° C. after crystallization from chloroform and petroleum ether. The salt forms a soapy solution in water.

*Example 16*

A trace amount of iodine is added to a mixture of 1.7 parts of magnesium and 18 parts of ether. All of the ether is removed by distillation, and the magnesium is covered with a fresh portion of 70 parts of ether. A solution of 9 parts of allyl bromide in 70 parts of ether is slowly added to the stirred reaction mixture, after which there is gradually added a solution of 2 parts of 3-methoxy-2,5(10)-estradien-17-one in 70 parts of ether. The reaction mixture is heated under reflux for an additional hour, and then a solution of 10 parts of sodium potassium tartrate in 100 parts of water is cautiously added with efficient stirring. The ethereal layer is separated, washed with water, dried over sodium sulfate and filtered. The residue obtained by concentration of the filtrate is recrystallized from a mixture of ether and methanol, yielding a product melting at about 88–96° C. which is predominantly 17α-allyl - 3-methoxy - 2,5(10) - estradien-17-ol. A mixture of 1.5 parts of this product, 32 parts of methanol, 5 parts of water and 1.8 parts of concentrated hydrochloric acid is heated under reflux for 5 minutes. The gummy product obtained by dilution of the reaction mixture with water is washed several times by decantation with water, and dried. It is purified by crystallization from a mixture of acetone and petroleum ether or by chromatographic fractionation on silica gel. In this manner there is obtained 17-allyl-19-nortestosterone melting at about 95.5–96.5° C.

A mixture of 5 parts of 17-allyl-19-nortestosterone, 100 parts of dioxane and 1.5 parts of 5% palladium on charcoal catalyst is shaken in contact with a hydrogen atmosphere until approximately 1 molecular equivalent of hydrogen has been consumed. The catalyst is removed by filtration and the filtrate is concentrated under reduced pressure. When the residue obtained by vaporization of the solvent is recrystallized repeatedly from a mixture of acetone and petroleum ether, there is obtained 17-propyl-19-nortestosterone melting at about 120–122° C.

To a solution of 28 parts of 17α-propyl-19-nortestosterone in 200 parts of methanol is added a solution of 17.5 parts of sodium borohydride in 120 parts of methanol. The mixture is maintained at room temperature for 45 minutes and then treated with 5 parts of water and 15 parts of acetic acid. The reaction mixture is diluted with water and chilled. The precipitate is collected on a filter and recrystallized from aqueous methanol. The mixture of the 17α-propyl-4-esterene-3β,17β-diol and 17α-propyl-3α,17β-diol thus obtained shows infrared maxima at 2.9 and 6.0 microns.

*Example 17*

A solution of 35 parts of sodium borohydride in 250 parts of methanol is added to a solution of 56 parts of 17α-allyl-19-nortestosterone in 400 parts of methanol. The mixture is kept at room temperature for 30 minutes, diluted with 10 parts of water and rendered weakly acid by addition of acetic acid. On further dilution with water and chilling a precipitate is formed which is collected on a filter and recrystallized repeatedly from aqueous methanol and a mixture of acetone and petroleum ether. The infrared spectrum of the 17α-allyl-4-estrene-3,17-diol thus obtained in the form of a mixture of epimers shows maxima at 2.9 and 6.0 microns. Hydrogenation of a methanolic solution of this product using a palladium on charcoal catalyst yields 17α-propyl-4-estrene-3,17-diol. As in the preceding example a mixture of epimers is obtained. The infrared spectrum confirms the identity of the products of this and the preceding example.

What is claimed is:

1. A member of the class consisting of compounds of the structural formula

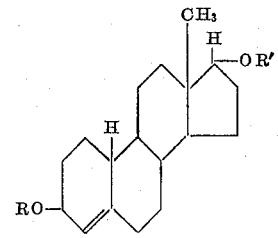

and

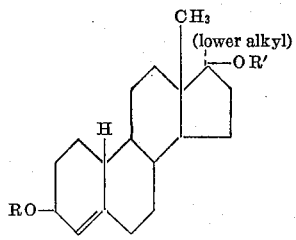

wherein R and R' are members of the class consisting of hydrogen, benzoyl and acyl radicals derived from saturated aliphatic carboxylic acids containing 1 to 8 carbon atoms.

2. 4-estrene-3,17-diol.
3. A compound of the structural formula

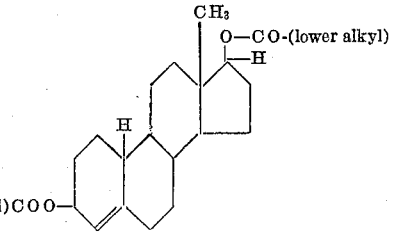

4. 3,17-dipropionoxy-4-estrene.
5. 17α-(lower alkyl)-4-estrene-3,17-diol.
6. 17α-ethyl-4-estrene-3,17-diol.
7. 17α-methyl-4-estrene-3,17-diol.
8. A compound of the structural formula

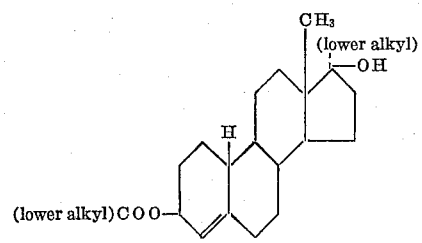

9. 17α-ethyl-3-propionoxy-4-estren-17-ol.

References Cited in the file of this patent

UNITED STATES PATENTS

| | | |
|---|---|---|
| 2,159,569 | Ruzicka | May 23, 1939 |
| 2,311,067 | Miescher et al. | Feb. 16, 1943 |
| 2,374,369 | Miescher et al. | Apr. 24, 1945 |
| 2,374,370 | Miescher et al. | Apr. 24, 1945 |
| 2,705,721 | Nysted | Apr. 5, 1955 |

OTHER REFERENCES

Hershberger et al.: Proc. Soc. Exptl. Biol. Med., vol. 83, pages 175–180 (1953).